(12) United States Patent
Chu et al.

(10) Patent No.: US 10,939,047 B2
(45) Date of Patent: Mar. 2, 2021

(54) METHOD AND APPARATUS FOR AUTO-EXPOSURE CONTROL IN A DEPTH SENSING SYSTEM

(71) Applicant: HIMAX TECHNOLOGIES LIMITED, Tainan (TW)

(72) Inventors: Yu-Hsuan Chu, Tainan (TW); Yi-Nung Liu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 92 days.

(21) Appl. No.: 16/517,701

(22) Filed: Jul. 22, 2019

(65) Prior Publication Data

US 2021/0029284 A1 Jan. 28, 2021

(51) Int. Cl.
*H04N 5/225* (2006.01)
*H04N 5/235* (2006.01)

(52) U.S. Cl.
CPC ......... *H04N 5/2351* (2013.01); *H04N 5/2256* (2013.01); *H04N 5/2354* (2013.01)

(58) Field of Classification Search
CPC .................................................. H04N 5/2354
See application file for complete search history.

(56) References Cited

U.S. PATENT DOCUMENTS

| 10,306,152 B1* | 5/2019 | Chu ...................... H04N 5/2353 |
| 10,812,731 B2* | 10/2020 | Naing ................... H04N 5/2351 |
| 2017/0278243 A1 | 9/2017 | Kang |
| 2018/0276841 A1 | 9/2018 | Krishnaswamy |
| 2020/0020306 A1 | 1/2020 | Haruki |

FOREIGN PATENT DOCUMENTS

| CN | 109416829 A | 3/2019 |
| CN | 110069190 A | 7/2019 |
| CN | 110069201 A | 7/2019 |
| JP | 2018-137571 A | 8/2018 |
| TW | 201928649 A | 7/2019 |
| TW | I666508 B | 7/2019 |
| TW | 201933277 A | 8/2019 |

* cited by examiner

*Primary Examiner* — Gary C Vieaux
(74) *Attorney, Agent, or Firm* — Winston Hsu (57) ABSTRACT

A method for performing auto-exposure (AE) control in a depth sensing system includes: capturing a first reference image and a second reference image of a scene based on different illumination conditions; calculating a plurality of first block means with respect to first blocks of the first reference frame and calculating a plurality of second block means with respect to second blocks of the second reference frame; calculating a plurality of block mean differences according to the first block means and the second block means; determining a plurality of first region of interest (ROI) blocks from the first blocks and a plurality of a second ROI blocks from the second blocks; and performing an AE control over the depth sensing system according to blocks means of the first ROI blocks and blocks means of the second ROI blocks.

22 Claims, 4 Drawing Sheets

METHOD AND APPARATUS FOR AUTO-EXPOSURE CONTROL IN A DEPTH SENSING SYSTEM

BACKGROUND OF THE INVENTION

1. Field of the Invention

The present invention relates generally to a depth sensing system, and more particularly, to method and apparatus for auto-exposure control in a depth sensing system.

2. Description of the Prior Art

In active depth sensing, light with a known pattern is used to illuminate a scene or object in process often referred to as "structured light". Structure of the light with the pattern projected on the scene encodes depth information for the scene. Once the light pattern is found in a frame captured by a sensor, the 3-dimensional scene can be reconstructed. The relationship between the known projected light pattern and the decoded one can be used to derive depth information of the captured scene.

For such depth sensing technology, intensity of the projected light is essential and could have an influence on power consumption of the whole depth sensing system or accuracy of the sensed depth information. Therefore, there is a need for a decent auto-exposure control over the depth sensing system.

SUMMARY OF THE INVENTION

With this in mind, it is one object of the present invention to provide method and apparatus for auto-exposure (AE) control in a depth sensing system. The present invention estimates an illumination condition of a scene to get a reasonable AE and power control over light source of projectors and/or settings for sensing devices of the depth sensing system. In order to perform the illumination estimation fast, the present invention utilizes a pixel-binning technique to read out signals from the sensing device thereby to obtain reference frames with lower resolution, which significantly reduce the power consumption and computation loading. In addition, the present invention utilizes reference frames captured under different illumination condition to analyze difference between an intensity of ambient light of the scene and a predetermined intensity of light source of projector, thereby to determine a proper power for driving the light source of projector. To get accurate illumination condition estimation, the present invention relies on a region-of-interest determination process to exclude information that is meaningless or obstructive in estimating the illumination condition of the scene. By performing AE control properly and accurately, the depth sensing system can obtain more accurate depth information of the scene and avoid unnecessary power consumption.

According to one embodiment, a method for performing auto-exposure (AE) control in a depth sensing system is provided. The method comprises the step of: capturing a first reference image and a second reference image of a scene based on different illumination conditions; calculating a plurality of first block means with respect to first blocks of the first reference frame and calculating a plurality of second block means with respect to second blocks of the second reference frame; calculating a plurality of block mean differences according to the first block means and the second block means; determining a plurality of first region of interest (ROI) blocks from the first blocks and a plurality of a second ROI blocks from the second blocks; and performing an AE control over the depth sensing system according to blocks means of the first ROI blocks and blocks means of the second ROI blocks.

According to one embodiment, an apparatus for performing auto-exposure (AE) control in a depth sensing system is provided. The apparatus comprises: a sensing device, a block mean calculation unit, a block mean difference calculation unit, a region of interest (ROI) determining unit and an AE control unit. The sensing device is arranged to capture a first reference image and a second reference image of a scene based on different illumination conditions. The block mean calculation unit is arranged to calculate a plurality of first block means with respect to first blocks of the first reference frame and calculating a plurality of second block means with respect to second blocks of the second reference frame. The block mean difference calculation unit is arranged to calculate a plurality of block mean differences according to the first block means and the second block means. The ROI determining unit is arranged to determine a plurality of ROI blocks from the first blocks and a plurality of a second ROI blocks from the second blocks. The AE control unit is arranged to perform an AE control over the depth sensing system according to blocks means of the first ROI blocks and blocks means of the second ROI blocks.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the present invention. However, one of skilled in the art will understand how to implement the present invention in the absence of one or more specific details, or relying on other methods, elements or materials. In other instances, well-known structures, materials or operations are not shown or described in detail in order to avoid obscuring the main concepts of the present invention.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example.

Furthermore, the particular features, structures or characteristics may be combined in any suitable combinations and/or sub-combinations in one or more embodiments or examples.

Overview

Figure 1:
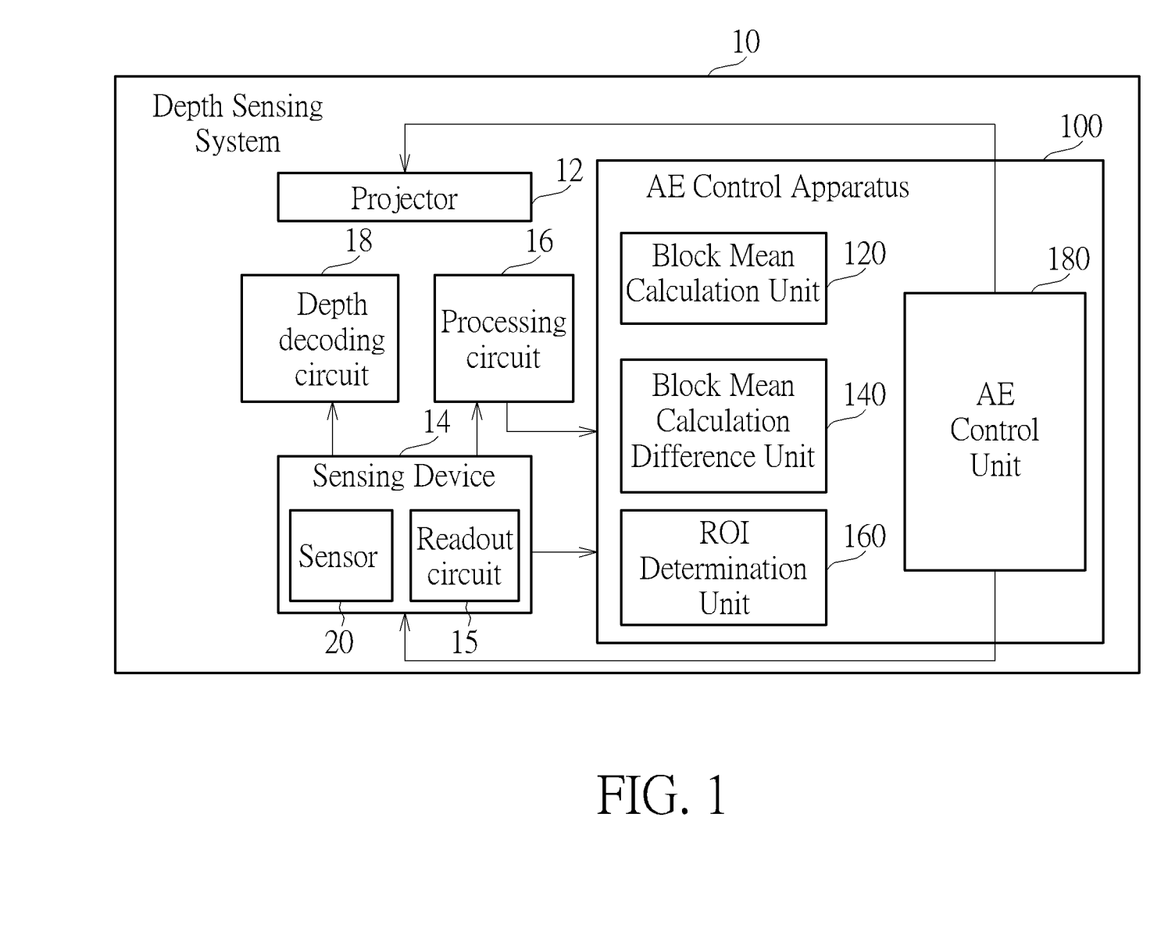
FIG. 1 illustrates a block diagram of a depth sensing system with an AE control apparatus according to one embodiment of the present invention.

FIG. 1 illustrates a block diagram of a depth sensing system 10 with an auto-exposure (AE) control apparatus 100 according to one embodiment of the present invention. The depth sensing system 10 includes a projector 12, a sensing device 14 and a processing circuit 16. Typically, the projector 12 is arranged to project a light with a known pattern onto a scene or an object. The sensing device 14 is arranged to capture frames of the scene or the object. The processing circuit 16 may be arranged to perform calculations regarding pixel-binning and/or down-sampling processing. Moreover, the depth sensing system 10 may also include a depth decoding circuit 18 which is arranged to decode depth information that is encoded in the known pattern. Specifically, the depth decoding circuit 18 decodes the depth information according to the frames of the scene or the object which the known pattern is projected onto. In one embodiment, the projector 12 has a light source, which is arranged to emit infrared (IR) light, while the sensing device 14 is capable of capturing IR light.

The AE control apparatus 100 is arranged to control at least power for driving the projector 12 (e.g. the intensity of the light projected by the light source) as well as an exposure time of a sensor 20 of the sensing device 14.

The AE control apparatus 100 comprises a block mean calculation unit 120, a block mean difference calculation unit 140, a region of interest (ROI) determining unit 160 and an AE control unit 180. The block mean calculation unit 120 is arranged to calculate block means of blocks of references frames with respect to a scene captured by the sensing device 14. The block mean calculation difference unit 140 is arranged to calculate block mean differences according to the calculated block means in two different reference frames. The ROI determining unit 160 is arranged to determine ROI blocks from the blocks of reference frames. The AE control unit 180 is arranged to determine an illumination condition of the scene and accordingly perform the AE control over the depth sensing system 10.

Image Capturing

In order to ascertain proper power for driving the light source of the projector 12 and/or a proper exposure time of the sensor 20 for a scene, the AE control unit 180 needs to collect information about illumination condition of a scene under ambient light first. Therefore, the AE control unit 180 requests the sensing device 14 to capture a first reference frame RF1 of the scene with no active light projected. At this moment, the light source of the projector 12 is turned off and the sensing device 14 captures the first reference frame RF1 of the scene with only the ambient light. Then, the AE control unit 180 requests the sensing device 14 to capture a second reference frame RF2 of the scene with active light projected. At this moment, the light source of the projector 12 is turned on and drive with a certain intensity level. The light source projects the light onto the scene and the sensing device 14 accordingly captures the second reference frame RF2 of the scene with the ambient light and the active light.

Typically, the sensor 20 of the sensing device 14 could sense the light and a readout circuit 15 of the sensing device 14 may read out signals from each pixel of the sensor 20 as sensed data. However, in order to save computation loading and power consumption, the sensed data may be read out in a pixel-binning manner to combine signals of multiple pixels of the sensor 20 into a single one. Specifically, the processing circuit 16 could perform pixel binning operations on the signals read out by the readout circuit 15 to combine signals of multiple pixels into a single one. Accordingly, a down-sampling process could be also performed by the processing circuit 16 on the read out signals to derive a data with reduced amount. That is, data of multiple pixels on the sensor 20 will be combined thereby to obtain a frame with a much lower resolution than a native resolution provided by the sensor 20. For example, the sensor 20 may be natively output a frame with 960×960 pixels. Through the pixel binning manner, a frame with 480×480 pixels can be obtained (2× pixel binning). Through the down-sampling process, a frame with 480×120 pixels could be obtained (4× row down-sampling). Please note that scale factors for pixel binning and scale factors for down-sampling could vary in various embodiments of the present invention. Alternatively, it is also possible to omit one of the pixel binning and down-sampling processes if the power consumption is not a huge concerned.

The AE control apparatus 100 of the depth sensing system 10 may rely on data processed by pixel binning and down-sampling that is performed by the processing circuit 16 to analyze illumination conditions. However, the depth decoding circuit 18 of the depth sensing system 10 will not rely on data processed under pixel binning and down-sampling since such processing may lead to a loss of depth information thereby to affect the accuracy of depth sensing.

Block Means

Figure 2:
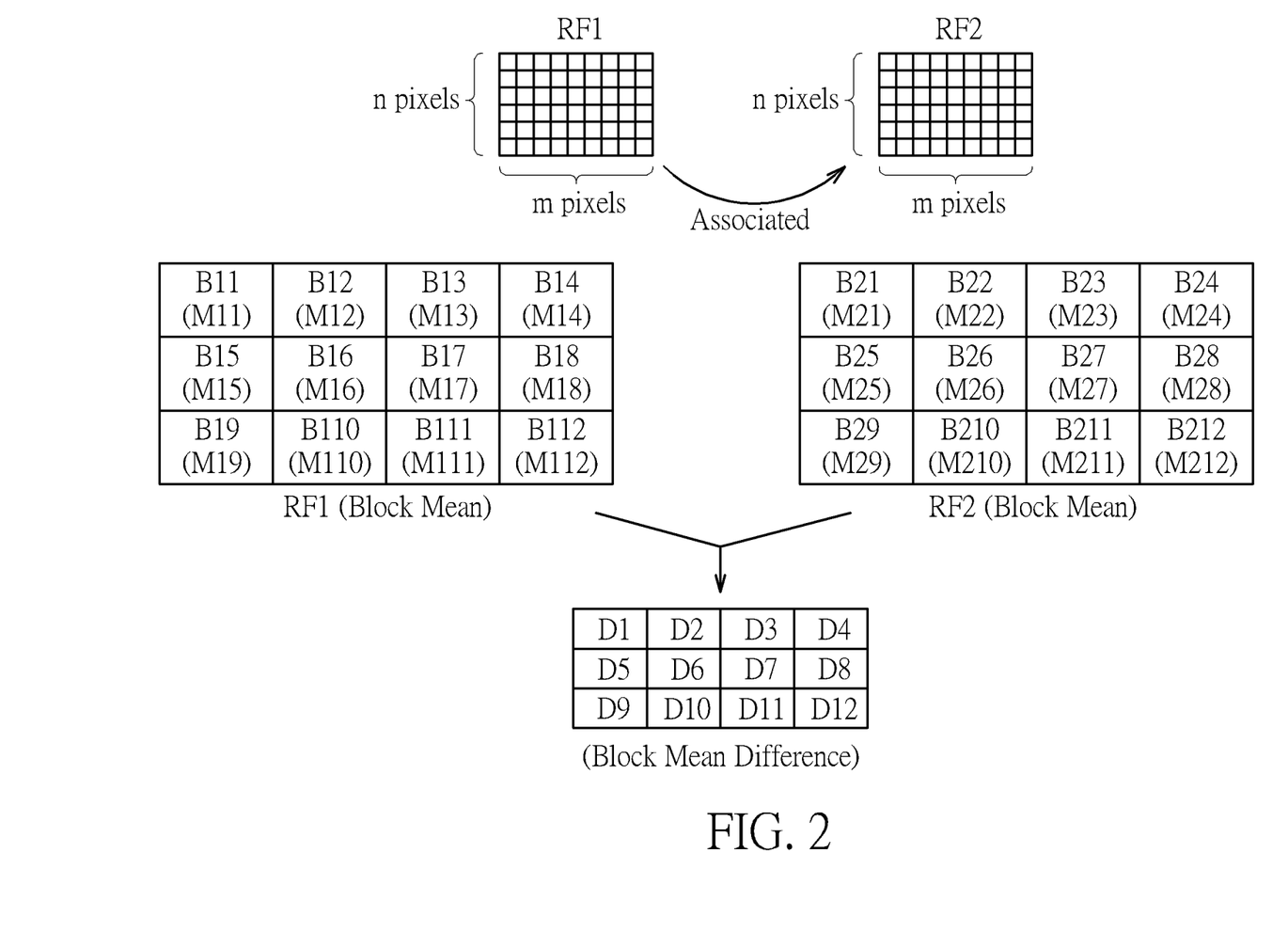
FIG. 2 illustrates how to calculate block means, block mean differences and relationship thereof according to one embodiment of the present invention.

Once the first reference frame RF1 and the second reference frame RF2 are captured, pixel data will be sent to the block mean calculation 120. The block mean calculation 120 divides the first reference frame RF1 and the second reference frame RF2 into multiple first blocks B11-B112 and multiple second blocks B21-B212 as shown by FIG. 2. Please note that the numbers of blocks the reference frames are divided into are not limitation of the present invention. According to various embodiments of the present invention, the first reference frame RF1 and the second reference frame RF2 could be divided into more or fewer blocks.

Each of the first blocks B11-B1N is associated with one of the second blocks B21-B2N since the first block B11-B1N are spatially identical to the second block B21-B2N. For example, as illustrated by FIG. 2, the first block B11 is associated with the second block B21, the first block B12 is associated with the second block B22, the first block B13 is associated with the second block B23 . . . , and so on. Typically, each of the first and the blocks are identical in size (i.e., both including m×n pixels).

The block mean calculation 120 calculates a block mean of each of first block B11-B112 according to sensed values of pixels included in one first block. Also, the block mean calculation 120 calculates a block mean of each of second block B21-B212 according to sensed values of pixels included in one second block. As the first block B11-B112 belong to the first reference frame FR1 that is captured with only ambient light, while the second block B12-B212 belong to the second reference frame FR2 that is captured with the ambient light and the active light, the block means M11-M112 of the first block B11-B112 may be different from the block means M21-M212 of the second block B21-B2N. After the block means M11-M112 of the first block B11-B112 and the block means M21-M212 of the second block B21-B212 are calculated, a block mean difference between to a block mean of a first block and a block mean of an associated second block will be calculated by the block mean difference calculation unit 140. For example, a block mean difference D1 between a block mean M11 of a first block B11 and a block mean M21 of a second block B21, a block mean difference D2 between a block mean M12 of the first block B12 and a block mean M22 of the second block B22, . . . , a block mean difference D12 between a block mean M112 of a first block B112 and a block mean M212 of a second block B212 will be calculated.

ROI Determining

After block means M11-M112 of the first blocks B11-B12, block means M21-M212 of the second blocks B21-B22, and the block mean differences D1-D12 are calculated, a region of interest (ROI) determining process is performed. Intended purposes of ROI determining process are to exclude those blocks having block means that is meaningless or obstructive in estimating the illumination condition of the scene. For example, if a block is associated with an object in the scene with a low/high reflectivity or a far place in the scene. Such block will be excluded because its block mean cannot fairly reflect the illumination condition of the scene properly. Similarly, if a block is associated with an object or a part of the scene that is over-exposed or under-exposed, the block will be also excluded since its block mean cannot fairly reflect the illumination condition of the scene properly as well.

Moreover, when one of first blocks B11-B112 is over-exposed, a corresponding one of the second blocks B21-B212 will inevitably be over-exposed. However, if one of first blocks B11-B112 is not over-exposed, the corresponding one of the second blocks B21-B212 may turn out over-exposed since the power of the projector 12 may be too strong.

For excluding the blocks associated with an object having low/high reflectivity or far place in the scene, each of block mean differences D1-D12 will be compared with a difference threshold. This is because the block means of the block associated with an object having low/high reflectivity or far place in the scene will not significantly vary with illumination conditions. Therefore, the corresponding block mean difference will be minor. If a block mean difference is lower than the difference threshold, corresponding blocks will be excluded in determining the ROI blocks. For example, if a block mean difference D3 between a block mean M13 of a first block B13 and a block mean M23 of a second block B23 is lower than the difference threshold, the first block B13 and the second block B23 will be excluded. In the contrary, if a block mean difference D3 between a block mean M13 of a first block B13 and a block mean M23 of a second block B23 is higher than the difference threshold, the first block B13 and the second block B23 will be determined as first ROI block ROIB13 and second ROI block ROIB23. When one of first blocks B11-B112 is under-exposed, a corresponding one of the second blocks B21-B212 may be properly exposed if the projector 12 provides moderate illumination to the scene/object.

Accordingly, the ROI determining unit 160 will determine the first ROI blocks ROIB11-ROIB1N from the first blocks B11-B112, while determines second ROI blocks ROIB21-ROIB2N from the second blocks B21-B212 based on the above-mentioned principles to exclude the blocks associated with an object having low reflectivity or far place in the scene.

Illumination Condition Determination

After the first ROI blocks ROIB11-ROIB1N are determined from the first blocks B11-B112 and the second ROI blocks ROIB21-ROIB2N are determined from the second blocks B21-B212, the AE control unit 180 will accordingly determine an illumination condition of the scene where the first reference frame RF1 and the second reference frame RF2 are captured. According to the determined illumination condition of the scene, the AE control unit 180 performs a proper control over the projector 12 and/or the sensing device 14.

Figure 3:
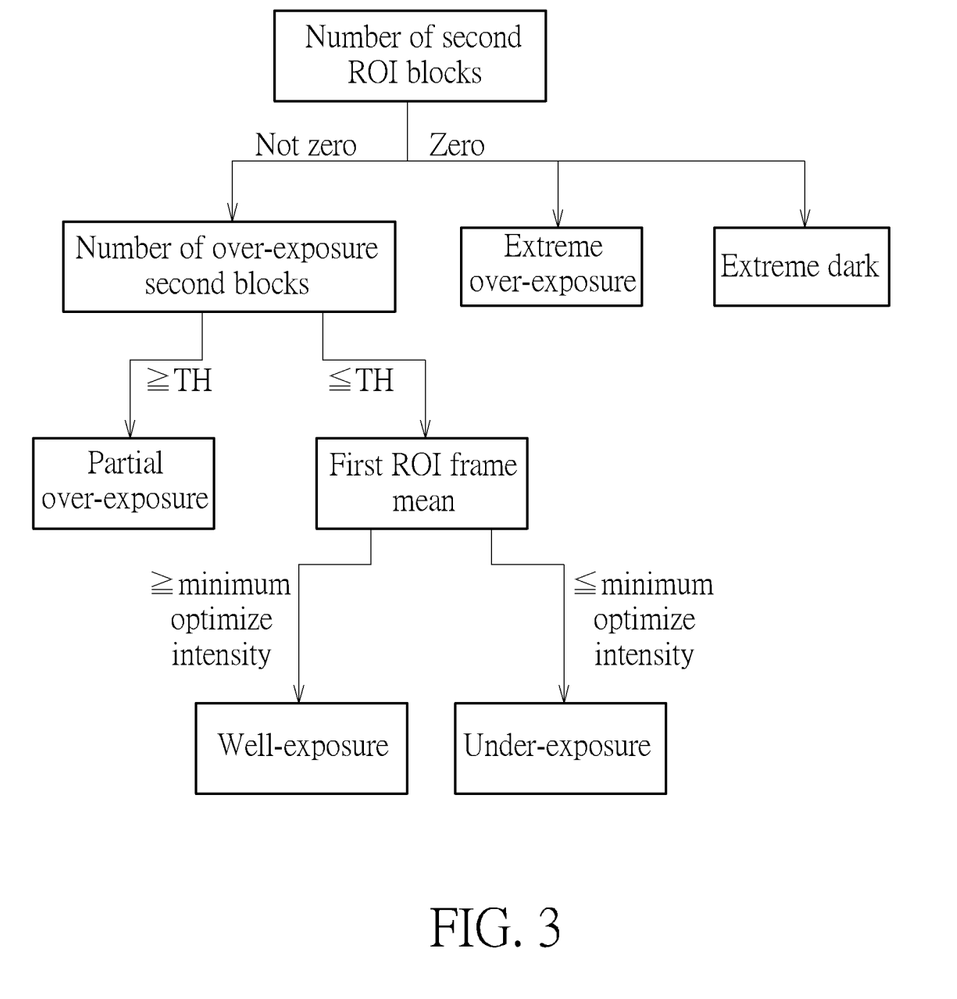
FIG. 3 illustrates how to determine an illumination condition of a captured scene according to one embodiment of the present invention.

Please refer to FIG. 3 for better understandings, wherein FIG. 3 illustrates a flow of determining an illumination condition of a scene. According to various embodiments of the present invention, the AE control unit 180 could determine an illumination condition of a scene as one of an extreme dark condition, an extreme over-exposure condition, a partial over-exposure condition, a well-exposure and an under-exposure condition.

At the beginning of the flow, the AE control unit 180 checks the existence of any ROI block. Specifically, AE control unit 180 will determine whether the number of second ROI blocks ROIB21-ROIB2N is zero. As mentioned above, if the illumination of the first reference frame FR1 is similar to that of the second reference frame FR2, no ROI block will be determined by the ROI determining unit 160.

If the number of the second ROI blocks is zero, it means the illumination condition of the scene is either extremely dark or extremely over-exposed. That is, all the second blocks B21-B212 are excluded due to extremely under-exposed or extremely over-exposed such that none of the second blocks B21-B212 is determined as a second ROI block.

Accordingly, it is determined why the number of second ROI blocks is zero. An average of block means of the second blocks B21-B212 is compared with an over-exposure threshold (e.g. greyscale of 250) and an under-exposure threshold (e.g. greyscale of 5). If the average of block means of the second blocks B21-B212 is lower than the under-exposure threshold, an extreme dark condition will be indicated. In such extreme dark condition, the AE control unit 180 will require the depth sensing system 10 to significantly increase power of the light source of the projector 12 or enlarge the exposure time of the sensor 20, thereby to get a brighter illumination condition for the scene. On the other hand, if the average of block means of the second blocks B21-B212 is higher than the over-exposure threshold, it is indicated an extreme over-exposure condition. In the extreme over-exposure condition, the AE control unit 180 will require the sensing device 14 to significantly reduce an exposure time of the sensor 20, thereby to avoid the signals read out from the sensor 20 being clipped when the power of the light source of the projector 12 is at the lowest level.

If the number of second ROI blocks ROIB21-ROIB2N is not zero (which means the second ROI blocks ROIB21-ROIB2N are not all extreme dark or extreme over-exposed), the AE control unit 180 will calculate a first ROI frame mean FM1 by averaging block means of the first ROI blocks ROIB11-ROIB1N and calculate a second ROI frame mean FM2 by averaging block means of the second ROI blocks ROIB21-ROIB2N.

The AE control unit 180 will determine the illumination condition of the scene as the partial over-exposure condition when a number of second ROI blocks having block means higher than an over-exposure threshold (i.e., over-exposure blocks) is higher than a block number threshold TH. For example, if there are 5 of second ROI blocks B21-B2N having the block means higher than an over-exposure threshold (e.g. 250), and therefore the number of the over-exposure second blocks is 5, which is higher than a block number threshold TH (e.g. 3), it is determined the illumination condition as the partial over-exposure condition. Accordingly, the AE control unit 180 calculates an adjustment factor according to a ratio of the first ROI frame mean FM1 to the second ROI frame mean FM2 (or even plus an offset). Based on calculated adjustment factor, the AE control unit 180 requires the depth sensing system 10 to slightly reduce power of the light source of the projector 12 thereby to get a more balanced illumination condition for the scene. Alternatively, the AE control unit 180 may require the depth sensing system 10 to reduce the exposure time of the sensor 20 according to the adjustment factor thereby to get a more balanced illumination condition for the scene.

On the other hand, the AE control unit 180 determines the illumination condition as the well-exposure condition or the under-exposure condition when a number of second ROI blocks having block means higher than an over-exposure threshold (i.e., over-exposure blocks) is lower than the block number threshold TH. For example, if there are 2 of second ROI blocks ROIB21-ROIB2N having the block means higher than an over-exposure threshold (e.g. 250), and therefore the number of the over-exposure second blocks is 2, which is lower than the block number threshold TH (e.g. 3), it is determined the illumination condition as the well-exposure condition or the under exposure condition.

To separate the well-exposure condition from the under-exposure condition, it is checked whether the first ROI frame mean FM1 is higher than a minimum optimized intensity. If the first ROI frame mean FM1 is higher than a minimum optimized intensity, the AE control unit 180 will determine the illumination condition of the scene as the well-exposure condition. In view of this, the AE control unit 180 calculates the adjustment factor according to a ratio of the first ROI frame mean FM1 to the second ROI frame mean FM2 (or even plus an offset). Based on calculated adjustment factor, the AE control unit 180 requires the depth sensing system 10 to adjust the power of the light source of the projector 12. If the first ROI frame mean FM1 is lower than the minimum optimized intensity, the AE control unit 180 will determine the illumination condition of the scene as the under-exposure condition. In view of this, the AE control unit 180 calculates the adjustment factor according to a ratio of the minimum optimized intensity to the second ROI frame mean FM2. Based on calculated adjustment factor, the AE control unit 180 requires the depth sensing system 10 to adjust the power of the projector 12, thereby to get a brighter illumination condition.

In one embodiment, when the illumination condition is determined as partial over-exposure, the AE control unit 180 will require the sensor 20 to reduce the exposure time according to a degree that the blocks are over-exposed. Specifically, it is determined the number of the ROI blocks that are over-exposed. According to the number of the ROI blocks that are over-exposed, the AE control unit 180 will require the sensor 20 to reduce the exposure time by a corresponding scaling factor. For example, the number of the ROI blocks that are over-exposed could classified as several levels: 1×, 2×, 4×, 8× and 16×, and thus the corresponding scaling factor to reduce the exposure time could be such as 0.625×, 0.5×, 0.375×, 0.25× and 0.125×, respectively.

Figure 4:
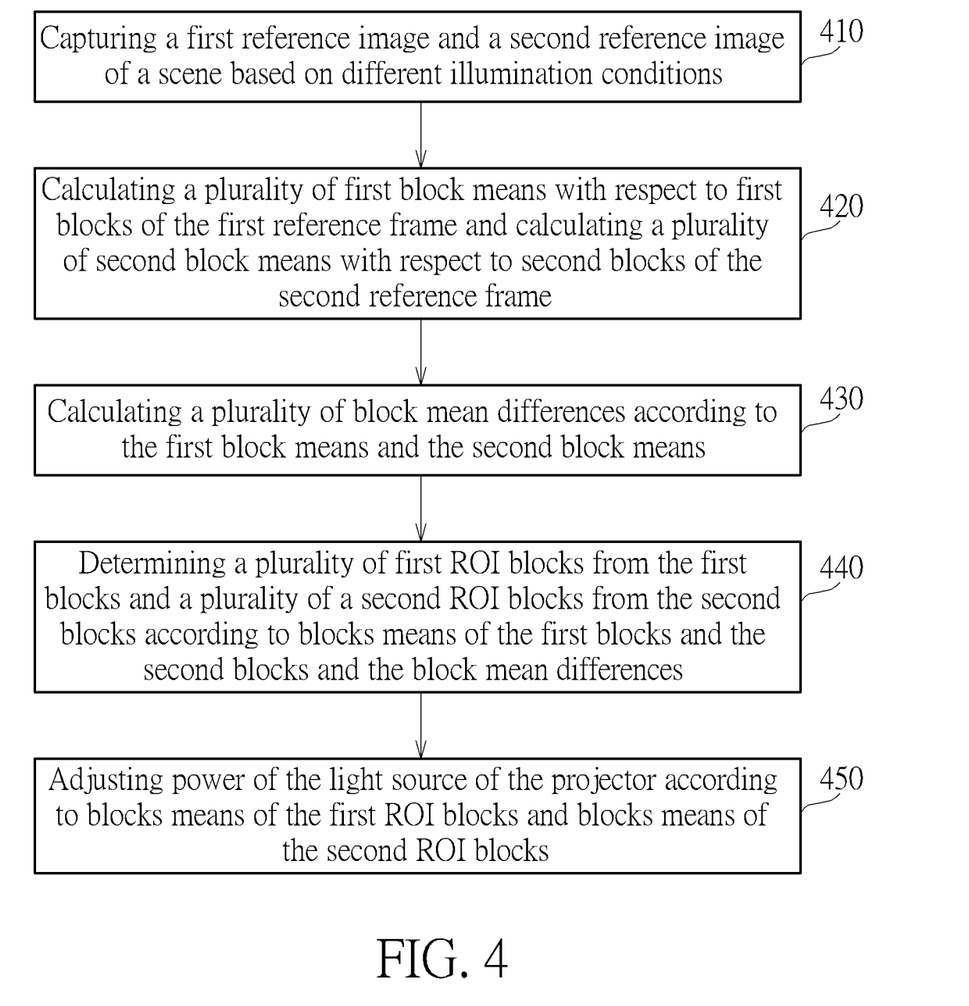
FIG. 4 illustrates a flow of operations of an AE control apparatus according to one embodiment of the present invention.

FIG. 4 illustrates a flow of main steps of operations of the AE control apparatus 100. The flow comprises steps of:

Step 410: Capturing a first reference image and a second reference image of a scene based on different illumination conditions Step 420: Calculating a plurality of first block means with respect to first blocks of the first reference frame and calculating a plurality of second block means with respect to second blocks of the second reference frame Step 430: Calculating a plurality of block mean differences according to the first block means and the second block means Step 440: Determining a plurality of first ROI blocks from the first blocks and a plurality of a second ROI blocks from the second blocks according to blocks means of the first blocks and the second blocks and the block mean differences Step 450: Adjusting power of the light source of the projector according to blocks means of the first ROI blocks and blocks means of the second ROI blocks.

As the principles and operations of the AE control apparatus 100 have been detailed in the above descriptions, descriptions regarding the flow of FIG. 4 are omitted here for the sake of brevity.

In summary, the present invention provides method and apparatus for auto-exposure (AE) control in a depth sensing system. The present invention estimates an illumination condition of a scene to get a reasonable AE control over projectors and/or sensing devices of the depth sensing system. In order to perform the illumination estimation fast, the present invention utilizes a pixel-binning technique to readout signals from the sensing device thereby to obtain reference frames with lower resolution, which significantly reduce the power consumption and computation loading. In addition, the present invention utilizes reference frames captured under different illumination conditions to analyze difference between an intensity of ambient light of the scene and a predetermined intensity of light source of the projector, thereby to determine a proper power for driving the light source of the projector. To get accurate illumination condition estimation, the present invention relies on a ROI determination process to exclude information that is meaningless or obstructive in estimating the illumination condition of the scene. By performing AE control properly and accurately, the depth sensing system can obtain more accurate depth information of the scene and avoid unnecessary power consumption.

Embodiments of the present invention can be implemented using hardware, software, firmware, and/or combinations thereof. Through an appropriate instruction execution system, embodiments of the present invention can be implemented using software or firmware stored in a memory. In terms of hardware, embodiments of the present invention can be implemented using any of the following technologies or a combination thereof: a separate logic having a logic gate capable of performing a logic function according to a data signal, and an application specific integrated circuit (ASIC), a programmable gate array (PGA), or a field programmable gate array (FPGA) having suitable combinational logics.

Flowcharts and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing auto-exposure (AE) control in a depth sensing system including a projector, comprising:
   capturing a first reference image and a second reference image of a scene based on different illumination conditions;
   calculating a plurality of first block means with respect to first blocks of the first reference frame and calculating a plurality of second block means with respect to second blocks of the second reference frame;
   calculating a plurality of block mean differences according to the first block means and the second block means;
   determining a plurality of first region of interest (ROI) blocks from the first blocks and a plurality of a second ROI blocks from the second blocks according to blocks means of the first blocks and the second blocks and the block mean differences; and
   adjusting power of a light source of the projector according to blocks means of the first ROI blocks and blocks means of the second ROI blocks.

2. The method of claim 1, wherein the step of generating the first reference frame and the second reference frame based on different light conditions comprises:
   capturing the first reference image in ambient light; and
   capturing the second reference frame with projecting light from a projector of the depth sensing system to the scene.

3. The method of claim 1, wherein the step of generating the first reference frame and the second reference frame based on different light conditions comprises:
   reading out signals from a sensor of the depth sensing system in a pixel-binning manner and performing a down-sampling process on the readout signals when capturing the first reference frame and the second reference frame.

4. The method of claim 1, the step of determining the first ROI blocks from the first blocks and determining the second ROI blocks from the second blocks comprises:
   when a first block mean is higher than a mean threshold, excluding a corresponding first block and a second block in determining the first and second ROI blocks.

5. The method of claim 1, the step of determining the first ROI blocks from the first blocks and determining the second ROI blocks from the second blocks comprises:
   when a block mean difference is lower than a mean difference threshold, excluding a corresponding first block and a corresponding second block in determining the first ROI blocks and the second ROI blocks.

6. The method of claim 1, the step of performing the AE control according to according to the blocks means of the first ROI blocks and the blocks means of the second ROI blocks comprises:
   determining an extreme dark condition when a number of the second ROI blocks is zero and an average of the block means of the second blocks is lower than an under-exposure threshold; and
   increasing power of a light source of the projector of the depth sensing system.

7. The method of claim 1, the step of performing the AE control according to according to the blocks means of the first ROI blocks and the blocks means of the second ROI blocks comprises:
   determining an extreme over-exposure condition when a number of the second ROI blocks is zero and an average of the block means of the second blocks is higher than an over-exposure threshold; and
   decreasing an exposure time of a sensor of the depth sensing system.

8. The method of claim 1, the step of performing the AE control according to according to the blocks means of the first ROI blocks and the blocks means of the second ROI blocks comprises:
   determining a partial over-exposure condition, a well-exposure or an under-exposure condition when the number of the second ROI blocks is not zero;
   calculating a first ROI frame mean and a second ROI frame mean;
   calculating an adjustment factor according at least the second ROI frame mean; and
   adjusting power of a light source of the projector according to the adjustment factor and an exposure time of a sensor of the depth sensing system.

9. The method of claim 8, the step of calculating the first ROI frame mean and the second ROI frame mean comprises:
   calculating the first ROI frame mean by averaging block means of the first ROI blocks; and
   calculating the second ROI frame mean by averaging block means of the second ROI blocks.

10. The method of claim 8, the step of determining the partial over-exposure condition, the well-exposure or the under-exposure condition comprises:
    determining the partial over-exposure condition when a number of second blocks having block means higher than an over-exposure threshold is higher than a block number threshold; and
    determining the well over-exposure condition when a number of second blocks having block means higher than the over-exposure threshold is lower than a block number threshold and the first ROI frame mean is higher than an minimum intensity; and
    the step of calculating the adjustment factor according to at least the second ROI frame mean comprises:
    calculating the adjustment factor according to a ratio of the first ROI frame mean to the second ROI frame mean.

11. The method of claim 8, the step of performing the AE control according to according to the blocks means of the first ROI blocks and the blocks means of the second ROI blocks comprises:
    determining the under over-exposure condition when a number of second blocks having block means higher than the over-exposure threshold is lower than a block number threshold and the first ROI frame mean is lower than an minimum illumination intensity; and
    the step of calculating the adjustment factor according to at least the second ROI frame mean comprises:
    calculating the adjustment factor according to a ratio of the minimum illumination intensity to the second ROI frame mean.

12. A apparatus for performing auto-exposure (AE) control in a depth sensing system including a projector, comprising:
- a sensing device, arranged to capture a first reference image and a second reference image of a scene based on different illumination conditions;
- a block mean calculation unit, arranged to calculate a plurality of first block means with respect to first blocks of the first reference frame and calculating a plurality of second block means with respect to second blocks of the second reference frame;
- a block mean difference calculation unit, arranged to calculate a plurality of block mean differences according to the first block means and the second block means;
- a region of interest (ROI) determining unit, arranged to determine a plurality of ROI blocks from the first blocks and a plurality of a second ROI blocks from the second blocks according to the block means of the first blocks and the second blocks and the block mean differences; and
- an AE control unit, arranged to adjust power of a light source of the projector according to blocks means of the first ROI blocks and blocks means of the second ROI blocks.

13. The apparatus of claim 12, wherein the sensing device is arranged to capture the first reference image in ambient light and capture the second reference frame with light projected from a projector of the depth sensing system to the scene.

14. The apparatus of claim 12, wherein the sensing device is arranged to read out signals from a sensor in a pixel-binning manner and perform down-sampling process on the readout signals when capturing the first reference frame and the second reference frame.

15. The apparatus of claim 12, wherein the ROI determining unit is arranged to exclude a first block and a correspond second block in determining the first and second ROI blocks when a corresponding first block mean is higher than a mean threshold.

16. The apparatus of claim 12, wherein the ROI determining unit is arranged to exclude a first block and a related second block in determining the first ROI blocks and the second ROI blocks when a corresponding block mean difference is lower than a mean difference threshold.

17. The apparatus of claim 12, wherein the AE control unit is arranged to determine an extreme dark condition when a number of the second ROI blocks is zero and an average of the block means of the second blocks is lower than a under-exposure threshold, thereby to accordingly increase power of a light source of the projector of the depth sensing system.

18. The apparatus of claim 12, wherein the AE control unit is arranged to determine an extreme over-exposure condition when a number of the second ROI blocks is zero and an average of the block means of the second blocks is higher than an over-exposure threshold, thereby to accordingly decrease an exposure time of a sensor of the depth sensing system.

19. The apparatus of claim 12, wherein the AE control unit is arranged to determine a partial over-exposure condition, a well-exposure or an under-exposure condition when the number of the second ROI blocks is not zero, calculate a first ROI frame mean and a second ROI frame mean and calculate an adjustment factor according at least the second ROI frame mean and accordingly adjust power of a light source of the projector according to the adjustment factor and an exposure time of a sensor of the depth sensing system.

20. The apparatus of claim 19, wherein the AE control unit is arranged to calculate the first ROI frame mean by averaging block means of the first ROI blocks and calculate the second ROI frame mean by averaging block means of the second ROI blocks.

21. The apparatus of claim 19, wherein the AE control unit is arranged to determine the partial over-exposure condition when a number of second blocks having block means higher than an over-exposure threshold is higher than a block number threshold, determine the well over-exposure condition when a number of second blocks having block means higher than the over-exposure threshold is lower than a block number threshold and the first ROI frame mean is higher than an minimum intensity and accordingly calculate the adjustment factor according to a ratio of the first ROI frame mean to the second ROI frame mean.

22. The apparatus of claim 19, the AE control unit is arranged to determine the under over-exposure condition when a number of second blocks having block means higher than the over-exposure threshold is lower than a block number threshold and the first ROI frame mean is lower than an minimum illumination intensity and accordingly calculate the adjustment factor according to a ratio of the minimum illumination intensity to the second ROI frame mean.

\* \* \* \* \*